United States Patent

Hanson et al.

[11] Patent Number: 5,951,609
[45] Date of Patent: Sep. 14, 1999

[54] METHOD AND SYSTEM FOR AUTONOMOUS SPACECRAFT CONTROL

[75] Inventors: Mark L. Hanson, Redondo Beach; Lorraine M. Fesq, Playa Del Ray, both of Calif.

[73] Assignee: TRW Inc., Redondo Beach, Calif.

[21] Appl. No.: 08/865,290

[22] Filed: May 29, 1997

[51] Int. Cl.⁶ .................................................. G06F 17/00
[52] U.S. Cl. .............................. 701/13; 701/14; 701/226; 244/161; 244/158 R
[58] Field of Search ................................ 701/13, 226, 14, 701/15, 16; 244/161, 164, 171, 176, 158 R, 75 R, 17.13

[56] References Cited

U.S. PATENT DOCUMENTS

| | | |
|---|---|---|
| 4,654,846 | 3/1987 | Goodwin et al. . |
| 4,730,798 | 3/1988 | Wertz ...................................... 244/171 |
| 4,739,498 | 4/1988 | Eichhorn . |
| 5,109,346 | 4/1992 | Wertz ...................................... 701/226 |
| 5,204,818 | 4/1993 | Landecker et al. . |
| 5,581,462 | 12/1996 | Rogers . |

FOREIGN PATENT DOCUMENTS

| | | |
|---|---|---|
| 0443597 | 8/1991 | European Pat. Off. . |
| 3214386 | 11/1983 | Germany . |

OTHER PUBLICATIONS

"Model–based Autonomous Systems in the New Millennium", by Brian C. Williams, Recom Technologies, published May 29, 1996.

"Spacecraft Autonomy in the New Millenium", by Fesq et al., Proceedings of the 19 AAS Guidance and Control Conference, published Feb. 1996.

"A Model–based Approach to Reactive Self–Configuring Systems", by Williams et al., Computational Sciences Division MS 269–2; NASA Ames Research Center, Aug. 4, 1996.

"Model–based Reasoning: Troubshouting", by Davis et al., Mass. Inst. of Tech.

"Modeling Power Systems for Diagnosis: How Good is Good Enough?", by Fesq et al., IEEE 27th Intersociety Energy Conversion Engineering Conference (IECEC), published Aug. 1992.

"Model–Based Diagnostics for Space Station Freedom", by Fesq. et al., IEEE 26th Intersociety Energy Conversion Engineering Conference (IECEC), published Aug. 1991.

"Spacecraft Command Verification: The AI Solution", by Fesq. et al., Godard Conference on Space Applications of Artificial Intelligence, published May 1990.

"On–Board Fault Management Using Modeling Techniques", by Fesq. et al., IEEE Intersociety Energy Conversion Engineering Conference, published Aug. 1989.

"Advances in Spacecraft Autonomy Using Artificial Intelligence Techniques", by Fesq et al., Feb. 1989.

(List continued on next page.)

*Primary Examiner*—William A. Cuchlinski, Jr.
*Assistant Examiner*—Gertrude Arthur
*Attorney, Agent, or Firm*—Michael S. Yatsko

[57] ABSTRACT

An autonomous control system supports autonomous operation of the a spacecraft in carrying out mission objective commands. The control system also provides autonomous fault detection, isolation and recovery. Performance problems and anomalies are detected and accounted for in the carrying out mission objectives. A mission manager module analyzes all incoming mission objective commands to verify that sufficient system resources are available and not already dedicated to other pending mission objective commands. A command processor is included to translate acceptable mission objective commands into lower level command sequences for delivery to a flight manager controlling the underlying spacecraft systems. The mission manager reanalyzes all pending mission objective commands whenever unexpected performance or fault conditions are detected. The mission objective commands can be constructed in a hierarchical fashion, with many sequences predefined within the spacecraft. All portions of the autonomous control system, including software and associated data, can be readily replaced, supplemented or disabled at any time before, during or after launch.

22 Claims, 7 Drawing Sheets

OTHER PUBLICATIONS

"Expert Systems on Spacecraft", by Lorraine M. Fesq.

"Autonomous Spacecraft Executive and Its Application to Rendezvous and Docking", Komoura et al., 3d Int'l. Symposium of AI, Robotics and Automation for Space, Oct. 1994.

"An Implemented Architecture Integrating On Board Planning, Scheduling, Execution, Diagnosis, Monitoring and Control for Autonomous Spacecraft", Pell et al., Proceedings of SPIE Conference on Optical Science, Engineering, and Automation, 1996.

"A System Architecture To Advance Small Satellite Mission Operations", Siewert et al., 9th Annual AIAA/Utah State University, Sep. 1995.

Marple: An Autonomous Diagnostician For Insolating System Hardware Failures, by Fesq, 1993.

"Expert Systems: A New Approach To Spacecraft Autonomy", by Cowles et al., TRW Space & Defense Quest, 1990.

METHOD AND SYSTEM FOR AUTONOMOUS SPACECRAFT CONTROL

BACKGROUND

1. Technical Field

The present invention relates generally to autonomous spacecraft control systems; and, specifically, it relates to onboard control systems which manage spacecraft operational systems, including performance monitoring and fault detection with adaptive fault recovery and performance optimization with little, if any, assistance from ground-based support.

2. Related Art

FIG. 1 is a schematic block diagram of a conventional spacecraftis interaction with ground based support. Particularly, a spacecraft 101 operates pursuant to sequences of low level commands (hereinafter "LLCs") received from remote ground support 103 via wireless transceivers 105 and 107. Ground support personnel work with monitoring and control systems 109 to formulate such LLC sequences to carry out a mission.

In most cases, to generate an LLC sequence, the personnel and the monitoring and control systems 109 must be aware of the current operating status of the spacecraft 101. Thus, a flight manager 111 is charged with continuously collecting data (hereinafter "monitoring data") received from pluralities of sensors 113 that monitor various spacecraft resources and hardware. The flight manager 111 must send the monitoring data and status information generated by the flight manager 111 to ground support 103. However, because of limitations in bandwidth, ground support 103 must direct the flight manager 111 to only send the portions of the available monitoring data and status information (together referred to hereinafter as ìdata streamsî) that currently seem most important.

As the data streams are received, the personnel and the monitoring and control systems 109 must analyze the data streams, and, if necessary, identify, modify or create LLC sequences for delivery to the spacecraft 101. The monitoring and control systems 109 transmit the LLC sequences to the spacecraft 101 where they are executed by a flight manager 111. The LLC sequences might, for example, direct the flight manager 111 to adjust one of actuators 115, disable or enable one of the sensors 113, and/or initiate operation of a payload processor 117 to manipulate a payload 119.

Additionally, through continuous monitoring and analysis of the spacecraft data streams, the ground support 103 attempts to determine the success or failure of LLC sequences executed by the flight manager 111. If, for example, an LLC sequence caused a misalignment of the spacecraft 101 as determined through monitoring and analyzing subsequent data streams received, the ground support 103 must attempt to generate a new LLC sequence (and possibly others thereafter) with hopes of achieving alignment.

Calculations needed to generate the LLC sequence become quite complex even for seemingly easy tasks due to changing spacecraft conditions. Such calculations typically involve an analysis of current spacecraft data streams to predict the future status of the spacecraft 101 (e.g., orientation, velocity, acceleration, hardware operations, etc.) when an LLC sequence will be executed. The LLC sequences must be constructed and/or adjusted based on the prediction. If the prediction proves incorrect (e.g., due to unexpected changes in spacecraft conditions or system performance), the desired impact of the LLC sequences is generally not achieved. Thereafter, corrective action must be taken in the form of further LLC sequences which again rely on further predictions of future spacecraft status, which may again prove incorrect. Communication propagation times, available bandwidth constraints and ground support and spacecraft processing times often exacerbate the problem.

Compounding matters, there is an ever increasing demand on spacecraft performance to meet mission goals requiring travel to many destinations over longer distances to perform greater numbers of more complex operations. Correspondingly, spacecraft designers are charged with the onerous tasks of meeting such demands while reducing costs and increasing reliability. As a result, using the structure and operation set forth in FIG. 1, designs for both general purpose (and sometimes reusable) spacecraft and corresponding general purpose ground support systems have been attempted. The general purpose spacecraft and ground support are supposed to accommodate a wide variety of anticipated or potential missions. To accommodate such general purpose design, overall system complexity has dramatically increased.

Thus, to accommodate conventional spacecraft, ground support systems require very complex and costly monitoring and control systems capable of receiving and rapidly processing large amounts of spacecraft data so that accurate identification, generation and/or modification to LLC sequences can be achieved. The ground support systems must also be able to identify and overcome anamolous trends, and rapidly identify, isolate and recover from both spacecraft and ground system faults. As a design goal, the control, adjustment and recovery of a spacecraft should be possible under all circumstances. As can be appreciated, with conventional designs, this goal is not easily met.

SUMMARY OF THE INVENTION

Various aspects of the present invention may be found in a spacecraft system having a ground-based system and a spacecraft. Within the spacecraft, a flight manager controls a plurality of actuators pursuant to any of a plurality of lower level commands. The flight manager is also coupled to a plurality of sensors that produce data indicative of the operational status of the spacecraft. A transceiver within the spacecraft is capable of receiving selected ones of the plurality of lower level commands from the ground-based system destined for the flight manager. It is also capable of receiving selected ones of a plurality of higher level commands that represent the plurality of mission objectives. Additionally, an autonomous control system autonomously attempts to carry out the plurality of mission objectives through scheduling and occasionally rescheduling of the selected ones of the plurality of higher level commands received by the transceiver. The autonomous control system also generates, from the selected ones of the plurality of higher level commands, sequences of lower level commands that are delivery to the flight manager.

Other aspects can be found in several of many variations in the spacecraft system. For example, the autonomous control system may comprise a fault detection and recovery module that analyzes the data produced by the plurality of sensors to detect and attempt recovery from fault conditions in the operational status of the spacecraft. The autonomous control system may further comprise a mission agent that responds to the fault detection and recovery module by attempting to reschedule the selected ones of the plurality of higher level commands to accommodate detected fault conditions. Similarly, the autonomous control system may comprising a performance analyst that analyzes the data produced by the plurality of sensors to detect and attempt accommodation of unexpected performance in the operational status of the spacecraft. As such, a mission agent may be included that responds to the performance analyst by attempting to reschedule the selected ones of the plurality of higher level commands to accommodate the unexpected performance detected. A command processor may be added that performs the generation, from the selected ones of the plurality of higher level commands, of sequences of lower level commands that are delivery to the flight manager. Many other variations are possible.

Further aspects may be found in other embodiments as well. Specifically, an alternate spacecraft, having an operational status, may be used to carry out a plurality of mission objectives. This spacecraft may comprise a plurality of sensors producing data indicative of the operational status of the spacecraft and a plurality of actuators as before. A controller, communicatively coupled to control the plurality of actuators, operates pursuant to instructions received. An analyzer communicatively couples to the plurality of sensors to monitor and evaluate the data produced. A mission manager, communicatively coupled to the analyzer, schedules and occasionally reschedules instructions for the controller to autonomously carry out the plurality of mission objectives.

Again, many variations are possible. For example, the analyzer may comprise a fault detection and recovery module that analyzes the data produced by the plurality of sensors to detect and attempt recovery from fault conditions in the operational status of the spacecraft. Therein, the mission manager responds to the fault detection and recovery module by attempting to reschedule the instructions for the controller to accommodate detected fault conditions. The analyzer may alternatively or additionally comprise a performance analyst that analyzes the data produced by the plurality of sensors to detect and attempt accommodation of unexpected performance in the operational status of the spacecraft. In either case or otherwise, the sequences of the instructions used by the spacecraft can be stored within the spacecraft in a hierarchical arrangement.

In another embodiment, a spacecraft comprises a mission manager, communicatively coupled to an analyzer, that schedules and occasionally reschedules higher level instructions to autonomously carry out the plurality of mission objectives. A command processor, communicatively coupled to receive scheduled higher level instructions from the mission manager, generates lower level instructions from the higher level instructions received. A control module, communicatively coupled to control the plurality of actuators, operates pursuant to lower level instructions received from the command processor. The many aforementioned variations may also apply. In addition, for example, the spacecraft may further comprise a library that contains sequences of the lower level instructions, and the command processor generates lower level instructions for each of the higher level instructions by referencing the library. Revealing other aspects of the present invention, a spacecraft system comprises a spacecraft capable of carrying out a plurality of mission objectives. The system also contains a plurality of ground units each having a ground transceiver. Disposed on the spacecraft, a flight manager controls a plurality of actuators pursuant to any of a plurality of lower level commands. A spacecraft transceiver can receive and route one of the plurality of lower level commands from at least one of the plurality of ground units to the flight manager. An autonomous control system carries out one of the plurality of mission objectives through receipt, scheduling and occasionally rescheduling of higher level commands. The autonomous control system translates the higher level commands into sequences of lower level commands for delivery to the flight manager.

In addition, at least one of the plurality of ground units may comprise a ground support system, while another may comprise a transmitter having a user interface to initiate delivery of one or more higher level commands to the autonomous control system via the spacecraft transceiver. Previously mentioned and many other variations also apply.

Further aspects of the present invention will be apparent from the following detailed description, taken in connection with the accompanying drawings, and from the individual features and relationships of the respective appended claims.

DETAILED DESCRIPTION

Figure 1:
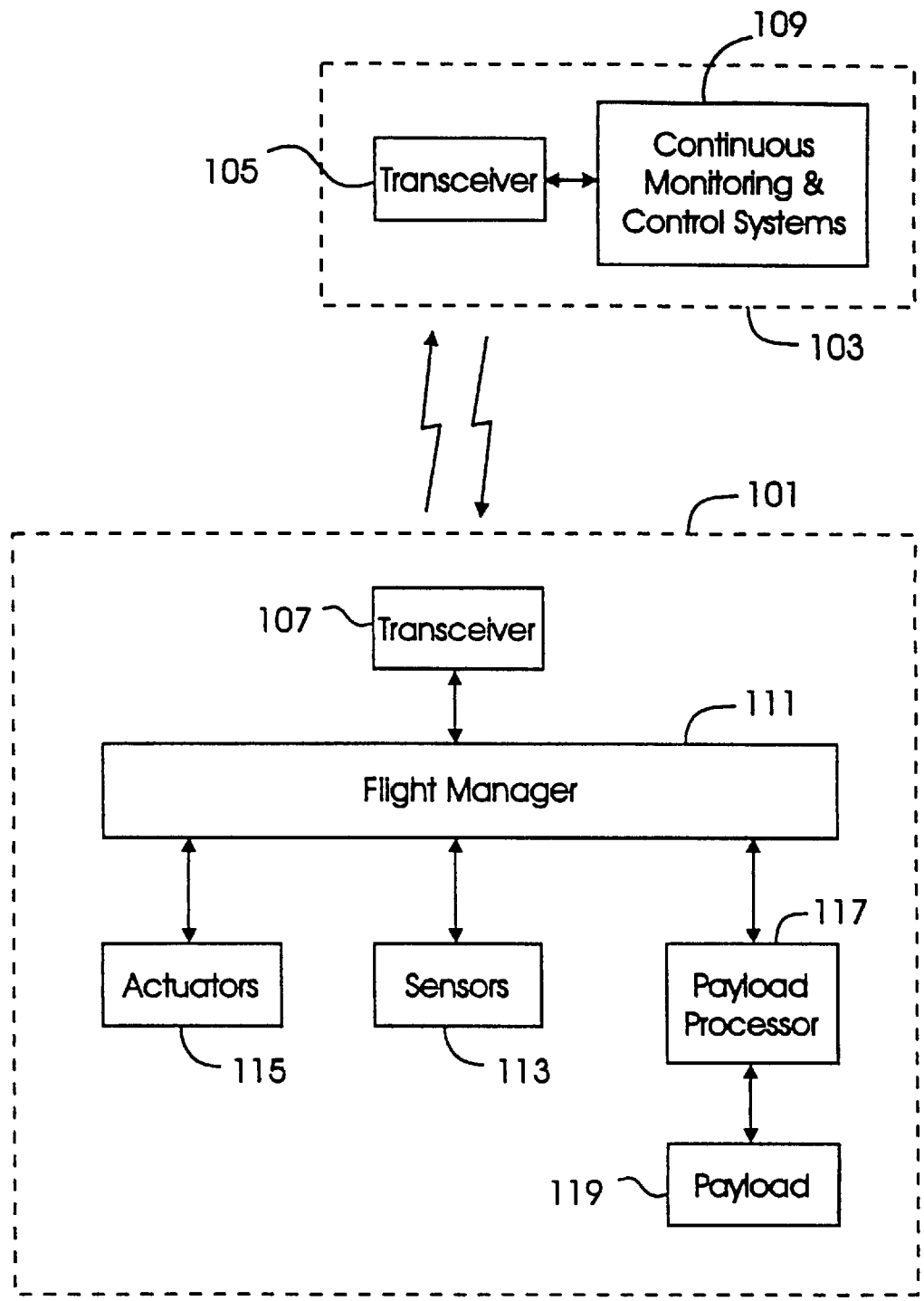
FIG. 1 is a schematic block diagram of a conventional spacecraftís interaction with conventional ground based control systems, used to illustrate several of many problems associated therewith.

FIG. 1 is a schematic block diagram of a conventional spacecraftIs interaction with conventional ground based control systems, used to illustrate several of many problems associated therewith. As previously discussed in the background section above, the conventional spacecraft 101 operates pursuant to LLC (Low Level Command) sequences constructed at ground support 103 by the monitoring and control systems 109. To accommodate such control, the conventional spacecraft 101 delivers continuous data streams to the monitoring and control systems 109 for analysis. Within the conventional spacecraft 101, the flight manager 111 receives and executes LLC sequences received, and captures and delivers sensor and other operational data and status information through the transceivers 107 and 105 to the monitoring and control systems 109.

Figure 2:
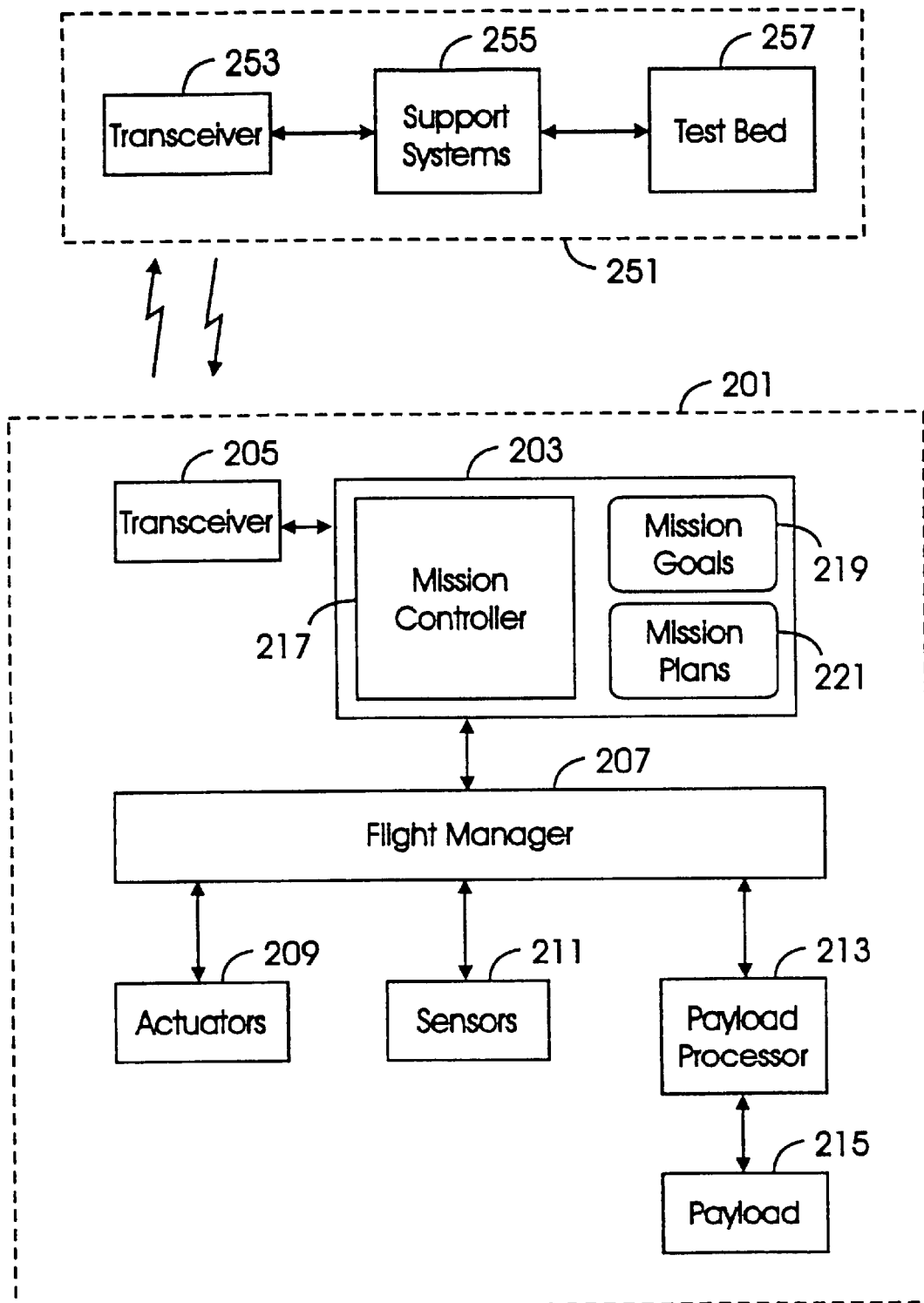
FIG. 2 is a schematic block diagram of an autonomous spacecraft and ground support systems built in accordance with the present invention that illustrates autonomous operation and control of spacecraft operations to accomplish mission objectives.

FIG. 2 is a schematic block diagram of an autonomous spacecraft and ground support systems built in accordance with the present invention that illustrates autonomous operation and control of spacecraft operations to accomplish mission objectives. Specifically, an autonomous spacecraft 201 comprises an autonomous control system 203 placed, for example, within a conventional spacecraft such as that of FIG. 1. Within the autonomous spacecraft 201 conventional hardware and/or software components such as a transceiver 205, a flight manager 207, actuators 209, sensors 211, a payload processor 213 and a payload 215 can be found. Although possible and potentially desirable in some circumstances, such underlying conventional components and their interactions need not be modified to accommodate the autonomous control system 203.

Within the autonomous control system 203, a mission controller 217 is charged with carrying out one or more mission goals 219. From the mission goals 219, the mission controller 217 generates mission plans 221 which provide scheduling information indicating how the autonomous spacecraft 201 will operate to carry out the mission goals 219. Following the plans 221, the mission controller 217 generates and delivers LLC sequences to the flight manager 207 when appropriate so that the flight manager 207 can carry out the underlying mission goals 219.

The mission controller 217 monitors data streams from the flight manager 207 as would such conventional ground support. The mission controller 217 selectively uses the data streams not only to determine the success or failure of a delivered LLC sequence, but also to monitor the operational status of the autonomous spacecraft 201. In particular, the mission controller 217 utilizes one or more mission goals 219 to generate mission plans 221. The mission goals 219 may have been communicated before, during or at any time after launch. A mission goal might, for example, be to perform a delta V on a particular date, at a particular time and for a desired duration. Another mission goal might be to take infrared pictures of a region on earth within a specific range of time each day for multiple consecutive days in response to a field commanderis request. Instead of formulating LLC sequences to carry out such mission goals at ground support 251, the mission goals themselves are delivered by ground support 251 to the mission controller 217.

Upon receipt and verification of a new mission goal, the mission controller 217 begins planning and scheduling using its knowledge of the status of spacecraft hardware and software systems, resource availability, and mission performance profiles (e.g., fault status, fuel remaining, perceived battery discharge rates, etc.) to create a plan that achieves the new mission goal.

The mission controller 217 considers other mission goals and plans when generating a plan for a new mission goal. Doing so may result in alternate or modified plans for carrying out other mission goals.

The mission controller 217 also identifies mission goals which cannot be carried out due to direct conflict with other mission goals or due to impossibility with projected or actual spacecraft resources and system limitations. Upon such occurrences, the mission controller 217 communicates with ground support 251 for resolution.

The mission controller 217 reconsiders all plans for carrying out mission goals whenever system resources (actual or projected) become unavailable, e.g., through component fault. Similarly, such reconsideration occurs whenever a change in system performance is detected, e.g., where anomalies or trends in performance are found. For example, the detection of an inaccurate prediction of fuel consumption triggers a reconsideration of all pending mission goals to verify that they can be accomplished. Through such ongoing planning and replanning, the mission controller 217 attempts to carry out all mission goals received no matter what state the spacecraft 201 happens to be in. The mission controller 217 also attempts to formulate mission plans that minimize strain on system resources.

Ground support 251 comprises a transceiver 253, support systems 255 and a test bed 257. As previously mentioned, ground support 251 does not control the autonomous spacecraft 201 to carry out typical mission goals in most circumstances. However, the support systems 255 may be used to take over control of the spacecraft 201 should the mission controller 217, for example: 1) fail to resolve conflicting mission goals; 2) be incapable of carrying out an unexpected mission goal; 3) arrive at undesirable plans; or 4) suffer from a fault condition.

Thus, personnel using the support systems 255 have the capability of accessing, replacing or canceling previously delivered mission goals at any time, e.g., to address conflicts, terminate goals no longer necessary, identify pending mission goals, etc. Likewise, mission plans 221 may be retrieved, modified and redelivered or canceled by the support systems 255. Moreover, if the mission controller 217 is not configured to adequately generate a mission plan based for example on an unexpected operational maneuver desired, the support systems 255 can be used to generate and deliver such a mission plan to the autonomous control system 203 for integration with the other of the mission plans 221.

Although not typically performed, the ground support systems 255 may also be used to generate and transmit LLC sequences to the flight manager 207. Upon receiving an LLC sequence, the mission controller 217 relays the sequence to the flight manager 207 for execution. The support systems 255 may also direct the mission controller 217 to relay data streams related to spacecraft operations to permit the construction of LLC sequence and to evaluate the impact of the sequence on the autonomous spacecraft 201. Although the flight manager 207 processes LLC sequences without knowledge of the source of the sequence, the flight manager 207 could be modified to consider the source if need arises.

Thus, conventional spacecraft such as those illustrated in FIG. 1 may be easily equipped with an autonomous control system 217. So equipped, such spacecraft operate autonomously to carry out mission goals with minimal monitoring and intervention from ground support. With their duties relaxed, ground support systems and personnel are free to support larger numbers of spacecraft than would otherwise be possible, lowering overall mission costs. And if an autonomous control system fails or proves unsatisfactory or insufficient for a given mission, it can be assisted by ground support or effectively disabled and replaced by ground support.

Additionally, the mission controller 217 can be reprogrammed from the support systems 255. Programming can be supplemented, replaced or otherwise modified to, for example, accommodate unexpected mission goals, fix bugs or faults in the mission controller 217 or other portions of the spacecraft systems, or support debugging. Similarly, associated data used by the mission controller 217 can also be replaced, supplemented or modified. Such (re)programming normally takes place during development when the spacecraft 201 or components thereof are placed in the test bed 257. After development, such as during flight, (re)

programming takes place via the transceivers 253 and 205. In this way, deficiencies in an autonomous spacecraft (often due to the many unforeseen circumstances peculiar to a specific mission) can be overcome after launch.

Although illustrated with independent functionality, the functionality of the autonomous control system 217 might alternatively be integrated partially or entirely into the flight manager 207. In fact, the autonomous control system 217 might replace the flight manager 207 or take over or duplicate some or all of the flight manageris functionality. Such approaches work best with new spacecraft designs that do not leverage off of conventional spacecraft hardware and software components, systems and subsystems with proven functional reliability.

The flight manager 207 typically contains all of the functionality traditionally placed in flight software such as guidance, navigation, control, power, global position and telemetry handling. It also is usually in direct contact with the spacecraft bus hardware and payload instruments, and, therefore, typically collects and provides all measurements and actuator commands.

Figure 3:
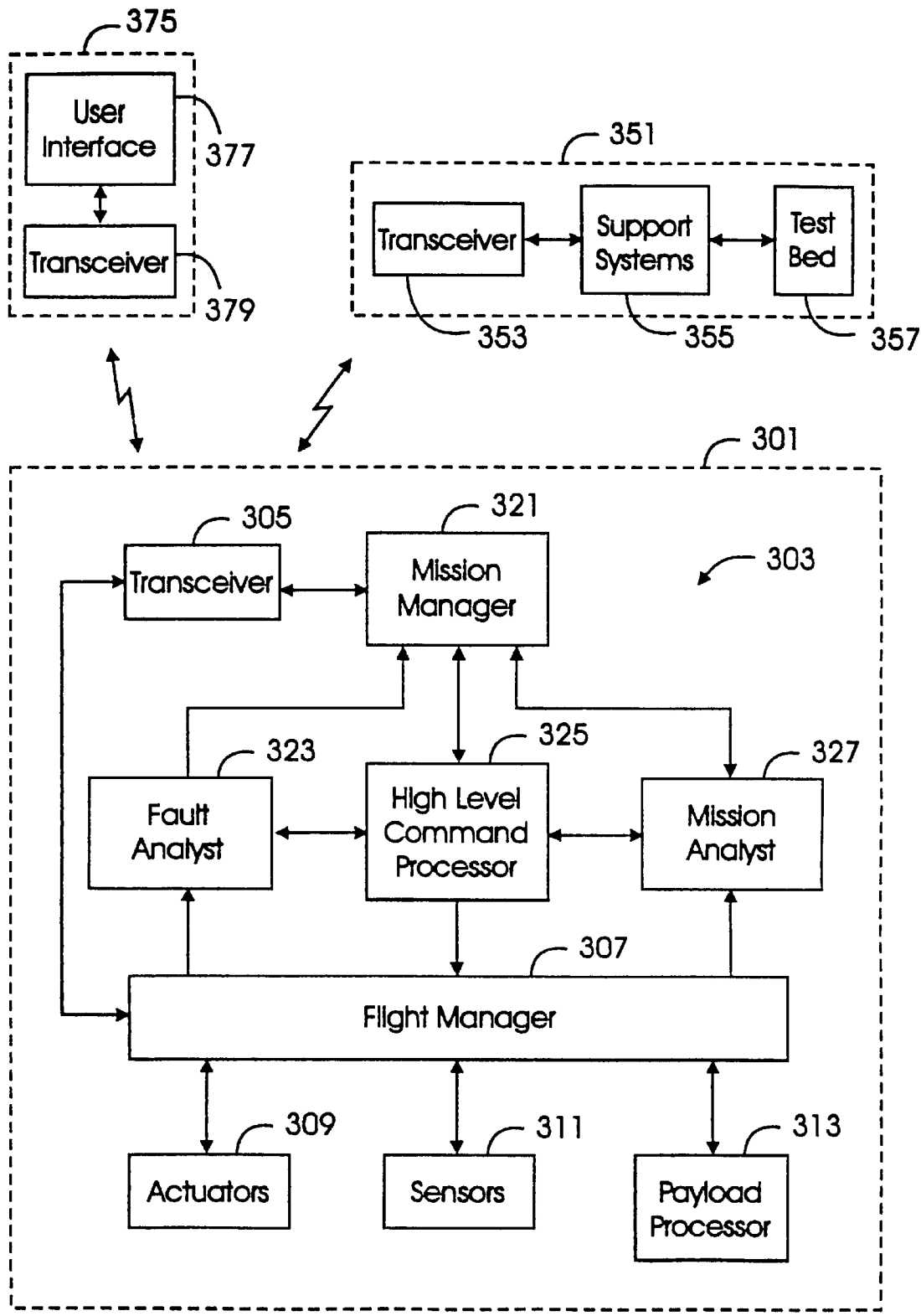
FIG. 3 is a schematic block diagram an exemplary embodiment the autonomous spacecraft and ground support systems of FIG. 2, used to illustrate features such as autonomous fault detection, identification and recovery processing and autonomous mission anomaly or trend detection and accommodation in accordance with the present invention.

FIG. 3 is a schematic block diagram of an exemplary embodiment of the autonomous spacecraft and ground support systems of FIG. 2, used to illustrate features such as autonomous fault detection, identification and recovery processing and autonomous mission anomaly or trend detection and accommodation in accordance with the present invention. With the functionality described above with reference to the corresponding elements of FIG. 2, an autonomous spacecraft 301 comprises an autonomous control system 303, a transceiver 305, a flight manager 307, actuators 309, sensors 311, a payload processor 313, etc.

At ground support 351, personnel use support systems 355 to deliver mission goals to the autonomous control system 303 via the transceivers 353 and 305. Such communications are relatively short (in comparison with corresponding LLC sequences), which not only conserves spacecraft power but also frees the communication channel and reduces processing time so that the support systems 355 can simultaneously support larger numbers of spacecraft. Again, pending mission goals, i.e., mission goals awaiting completion within the autonomous control system 303, may be replaced, retrieved, canceled, etc., from the support systems 355. If desired, LLC sequences may also be created and delivered by the support systems 355. Upon receipt, the autonomous control system 303 relays the LLC sequences to the flight manager 307 for execution.

Although only one is shown, pluralities of ground support systems such as ground support 351 might be used with the autonomous spacecraft 301. Furthermore, such systems may comprise scaled down versions merely for issuing mission commands and reviewing results. For example, a transmitter 375 (which may be portable or stationary) is used for sending new mission goals to the autonomous spacecraft 301. New mission goals are created or selected via a user interface 377, e.g., a keypad, and sent to the autonomous control system 303 via a transceiver 379. The user interface 377 might also communicate (via a display screen for example) the success, failure or results of the mission goal as reported by the autonomous control system 303 using the transceivers 305 and 379. The transmitter 375 might also be configured to receive and process specific output from the spacecraft 301, and/or comprise a computing device.

The autonomous control system 303 comprises a mission manager 321, a fault analyst 323, an HLC (high level command) processor 325 and a mission analyst 327. Upon receipt of a new mission goal, the mission manager 321 initiates a planning and scheduling phase wherein attempts are made to reconcile the new mission goal with all pending mission goals and based on the known constraints of the spacecraft 301. For example, a field commander using a hand-held version of the transmitter 375 might formulate a mission goal requesting delivery of a picture taken in the infrared spectrum of an enemy location at 12:00 hours. Upon receipt of the mission goal, the mission manager 321 uses an on-board position trajectory program module and knowledge of any pre-planned orbit maneuvers to determine where the satellite will be at the requested time. The mission manager 321 then determines if there will be sufficient power to enable the infrared instruments to image the desired target. If it concludes that imaging the target requires an attitude maneuver, the mission manager 321 determines the maneuver and its impact on the systems, resources and other mission goals of the autonomous spacecraft 301. This process continues until the mission manager 321 determines whether or not an image can be taken. If not, the mission manager 321 generates a response to the terminal 375 (and possibly to ground support 351) indicating the inability to handle the requested mission goal.

If the mission manager 321 determines that an image can be taken, the mission manager 321 delivers a desired HLC sequence (hereinafter a "HLC mission sequence") to the HLC processor 325. The HLC processor 325 breaks the HLC mission sequences into smaller subtasks and begins sequencing the commands. These sequences are referred to hereinafter as "LLC mission sequences" and correspond to rather simple operations expected by the flight manager 307 such as "power up infrared camera" or "capture image." At the appropriate times, the HLC processor 325 delivers the LLC mission sequences to the flight manager 307 for execution. Likewise, many pending mission goals can be simultaneously accommodated through resulting scheduled delivery of potentially interleaving LLC mission sequences by the HLC processor 325 to the flight manager 307.

During flight, the fault analyst 323 and the mission analyst 327 analyze data necessary to detect system faults and evaluate mission performance, respectively. Upon detecting a fault, the fault analyst 323 attempts to isolate the fault. Once isolated, the fault analyst 323 issues a sequence (or plurality of sequences) of HLCs (hereinafter a "HLC recovery sequence") to the HLC processor 325 to attempt to recover from the fault. In response, the HLC processor 325 translates the HLC recovery sequences into one or more LLC sequences (hereinafter "LLC recovery sequences"). The LLC recovery sequences are combined with the LLC mission sequences and delivered, when appropriate, to the flight manager 307.

Similarly, when the mission analyst 327 identifies performance deviations such as through data trending, the mission analyst 327 may attempt to accommodate or adjust for the variations by delivering an HLC sequence (hereinafter an "HLC performance sequence") to the HLC processor 325. The HLC processor 325 responds by translating the HLC performance sequence into one or more LLC sequences (hereinafter "LLC performance sequences"). The LLC performance sequences are combined with the LLC mission and fault sequences for delivery to the flight manager 307.

In addition, the flight manager 307 can receive LLC sequences (hereinafter "LLC ground sequences") directly from ground support 351 or the transmitter 375 (if so configured). Upon receipt of LLC ground sequences, the transceiver 305 merely routes the LLC ground sequences to the flight manager 307 for execution. Ground support 351 and the transmitter 375 may also send HLC sequences (hereinafter "HLC ground sequences") directly to the HLC processor 325 with the mission manager 321 acting as a relaying device.

Figure 4:
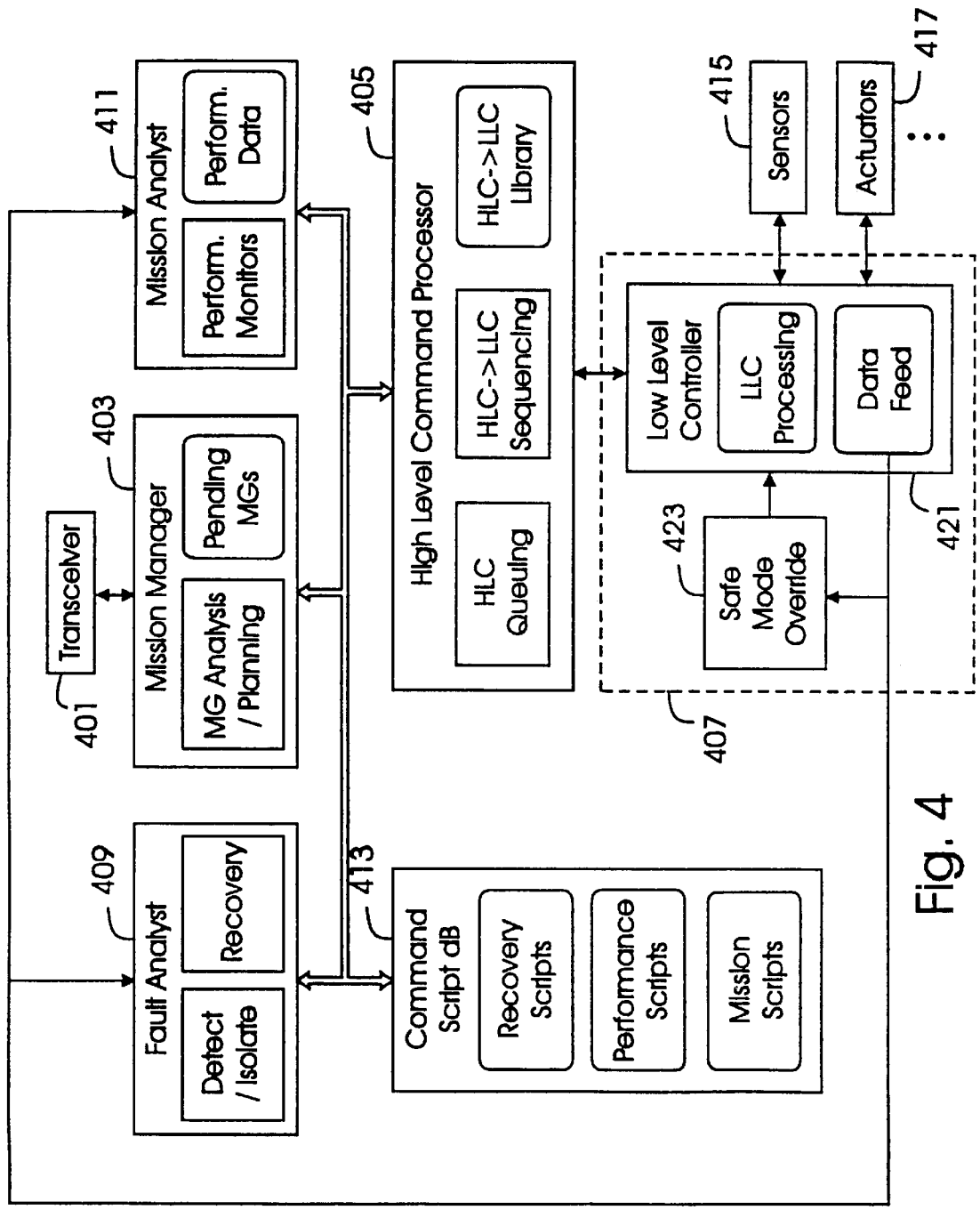
FIG. 4 is a schematic block diagram providing a detailed implementation of the autonomous spacecraft of FIG. 3 built in accordance with the present invention.

FIG. 4 is a schematic block diagram providing a detailed implementation of the autonomous spacecraft of FIG. 3 built in accordance with the present invention. An autonomous spacecraft comprises a transceiver 401, a mission manager 403, an HLC processor 405, a flight manager 407, a fault analyst 409, a mission analyst 411, sensors 415 and actuators 417 which generally operate as described in reference to like elements of FIG. 3. The autonomous spacecraft also comprises a command script database 413.

A mission goal may comprise a single HLC or may comprise a pointer (including any necessary variables) to a predefined HLC sequence (hereinafter a ìmission scriptî) stored in the command script database 413. For example, a mission goal might comprise a single HLC requesting relocation of the spacecraft to a specified destination by an indicated time. The mission manager 403 uses a ìmission moduleî (a software module) which corresponds to the single HLC that is executed by the mission manager 403 to analyze the feasibility of carrying out the single HLC in view of system resources and all other mission goals. If acceptable, the mission manager 403 stores the single HLC with other mission goals for future reference, e.g., during the analysis of new mission goals. The mission manager 403 also sends the single HLC to the HLC processor 405 for further processing.

If the mission goal comprises a pointer to a mission script, the mission manager 403 selects a mission module which corresponds to the mission script, and, as with the single HLC mission goal, is used to perform an analysis of feasibility. Of course, the mission module for the pointer might in turn invoke other mission modules that correspond to the underlying single HLCs making up the mission script. Likewise, the mission scripts stored within the command script database 413 may also contain pointers to other mission scripts stored therein. When processing such nested pointers, the mission manager 403 may again invoke further mission modules as needed to evaluate the underlying HLCs. Thus, mission scripts might comprise one or more HLCs together with one or more interleaving pointers to other mission scripts, one or more HLCs, or one or more pointers to other mission scripts. In this way, mission goals can be created at very high conceptual levels by leveraging off of more and more specific groupings of HLCs. Moreover, as a general rule, unless an encompassing mission module has been written, the mission manager 403 will execute a mission module for each and every HLC underlying a mission goal. If the mission goal comprising the pointer is acceptable, the mission manager 403 stores the pointer with other mission goals for future reference, and forwards the pointer to the HLC processor 405 for further processing.

Thus, the mission manager 403 contains a plurality of mission modules used by the mission manager 403 to analyze mission goals. Upon receiving a new mission goal, the mission manager 403 first verifies that it has a corresponding mission module dedicated to servicing the new mission goal. If not, the new mission goal is rejected, and the mission manager 403 communicates the rejection to the source of the mission goal, e.g., ground support or a ground based transmitter. Thereafter or at any time, ground support can deliver to the mission manager 403 new mission modules for future use. Available mission modules may also be replaced or canceled in the same manner.

The fault analyst 409 also utilizes scripts and software modules. The fault analyst 409 monitors data streams received from the flight manager 407, looking for spacecraft system faults. If detected, the fault analyst 409 attempts to isolate the fault. If successful, the fault analyst 409 selects one or more recovery scripts in the command script database 413, sends the HLC processor 405 pointers thereto, and informs the mission manager 403. Further detail regarding this process of autonomous fault identification, isolation and recovery can be found in a U.S. patent application Ser. No. 08/865,302, entitled "In Situ Method and System for Autonomous Fault Detection, Isolation and Recovery," filed on even date herewith by Hanson et al. Such application is hereby incorporated herein by reference in its entirety.

As with mission goals, recovery scripts may comprise one or a sequence of HLCs that are directed to placing at least part of the flight manager 407 or underlying spacecraft hardware and/or software components or systems in a condition addressing the isolated fault. The fault analyst 409 also parses the command script database 413 and, as proves necessary, disables or modifies recovery, performance and mission scripts therein to accommodate the fault. Modified or disabled scripts within the database 413 receive a flag indicating such conditions.

Thereafter, if scripts have been modified or disabled, the fault analyst 409 informs the mission manager 403 and the mission analyst 411. In response, the mission manager 403 first reexamines its pending mission goals to determine whether a flag has been associated therewith. If not, the mission manager 403 reanalyzes the pending mission goals to determine whether adequate system resources still remain. If adequate resources still remain, the mission manager 403 continues to operate as before except with restrictions that might be applicable to new mission goals that may be received.

If one or more pending mission goals have been disabled by the fault condition, the mission manager 403 relays such information to the requesting base support systems, reschedules the remaining pending mission goals, and directs the HLC processor 405 to remove the canceled mission goals from its queue. If a pending mission goal has been modified as indicated by a flag, the mission manager 403 reanalyzes the pending mission goals to determine whether adequate resources still exist. If so, the mission manager 403 reports the status to ground support and the HLC processor 405. Otherwise, the mission manager 403 selects a set of pending mission goals that can be accomplished, relays such information to ground support, and directs the HLC processor 405 to remove the remaining mission goals from its queue. Ground support may redirect the mission manager 403 if so desired to cancel and replace one or more of the selected pending mission goals to imake room for more important others that were not selected.

The mission analyst 411 also responds to an indication of fault by checking to see if any performance scripts are in queue at the HLC processor 405 that have been flagged. If a flag indicates cancellation, the mission analyst 411, like the mission manager 403, directs the HLC processor 405 to remove the performance script from queue. Afterwards, the mission analyst 411 communicates the problem to ground support for assistance. Similarly, ground support as well as the HLC processor 405 are contacted if a flag indicates modification.

Additionally, the mission analyst 411 monitors sensor readings, actuator commands and spacecraft information to determine how well mission objectives are being performed. These objectives might include, for example, trajectory tracking, expected versus actual power usage, and expected versus actual fuel consumption. If an anomolous trend is detected, e.g., any objective falling outside an allowable range, the mission analyst 411 informs the mission manager 403, identifies corresponding performance scripts (if available) from the command script database 413 and delivers any such scripts to the HLC processor 405 for queuing. The mission manager 403 responds by reanalyzing the pending mission goals to reconfirm their viability. Pending mission goals that cannot be supported are removed from the queue of the HLC processor 405. Reports to ground support follow.

The mission analyst 411 utilizes a series of ìperformance monitorsî which are software modules that, when enabled, monitor specific aspects of the underlying spacecraft systems. In response to HLCs received, the HLC processor 405 selectively enables ones of the available performance monitors as instructed. Scripts and goals call for enablement of specific performance monitors when relevant to underlying task.

As mentioned, the HLC processor 405 receives mission goals containing single HLCs and pointers to mission sequences. It also receives recovery and performance scripts. The HLC processor 405 converts all such scripts and goals to HLCs, and places all of the HLCs in a queue in time ordered sequence. Upon receipt of an indication that a modification to one or more goals or scripts have been made, the HLC processor 405 repeats this conversion and ordering process to address such modifications. Thus, as the execution time of an HLC approaches, the HLC processor 405 translates the HLC into corresponding LLC sequences, and delivers the LLC sequences to the flight manager 407 for execution at the appropriate time.

The HLC processor 405 translates the HLC through access to a library of LLC sequences. Using the HLC as an index, the HLC processor 405 extracts an LLC sequence that carries out the desired functionality of the HLC. Each HLC has a corresponding library entry containing an LLC sequence corresponding thereto. As with the mission goals, the LLC sequences may also point to other LLC sequences and so on in a hierarchical fashion.

Therefore, a single HLC may actually deliver several LLC sequences to the flight manager 407. HLCs often include data or variables specific to the desired task at hand. The HLC processor 405 merges data or variables into the LLC sequences before delivering them to the flight manager 407.

The HLC processor 405 correspondingly informs the fault analyst 409, the mission manager 403 and the mission analyst 411 when a recovery script, mission goal or performance script has begun execution and when it has completed. Completed goals or scripts are removed from pending lists. Once execution begins, scripts or goals can be canceled, but may require corrective action to counter LLCs already executed. Typically, such corrective action is specified by particular scripts associated with each HLC at issue, but may also be handled from ground support.

The LLC library within the HLC processor 405 can be supplemented, modified or replaced at any time from ground support via the transceiver 401 and the mission manager 403 routing. Similarly, the scripts within the command script database 413 can be supplemented or otherwise modified or canceled.

The flight manager 407 comprises a low level controller 421 and a safe mode override module 423. The low level controller 421 receives LLCs from the HLC processor 405 for execution. Pursuant to the LLCS, the low level controller 421 controls the operation of the spacecraftís hardware and/or software systems, subsystems and components. The low level controller 421 also gathers data from the sensors 415, for example, for delivery to the mission analyst 411 and fault analyst 409.

A safe mode override module 423 also monitors the gathered data. If a severe fault condition is detected, the safe mode override module 423 will issue LLCs to the low level controller 421 directing the entry of the spacecraft into a ìsafe mode,î awaiting ground support or the fault analyst 409 to recover the spacecraft. Thus, the safe mode override module 423 protects the spacecraft systems by minimizing potential damage resulting from a fault, but also protects the spacecraft systems from faults unexpectedly created or worsened by any portion of the autonomous control system.

Figure 5:
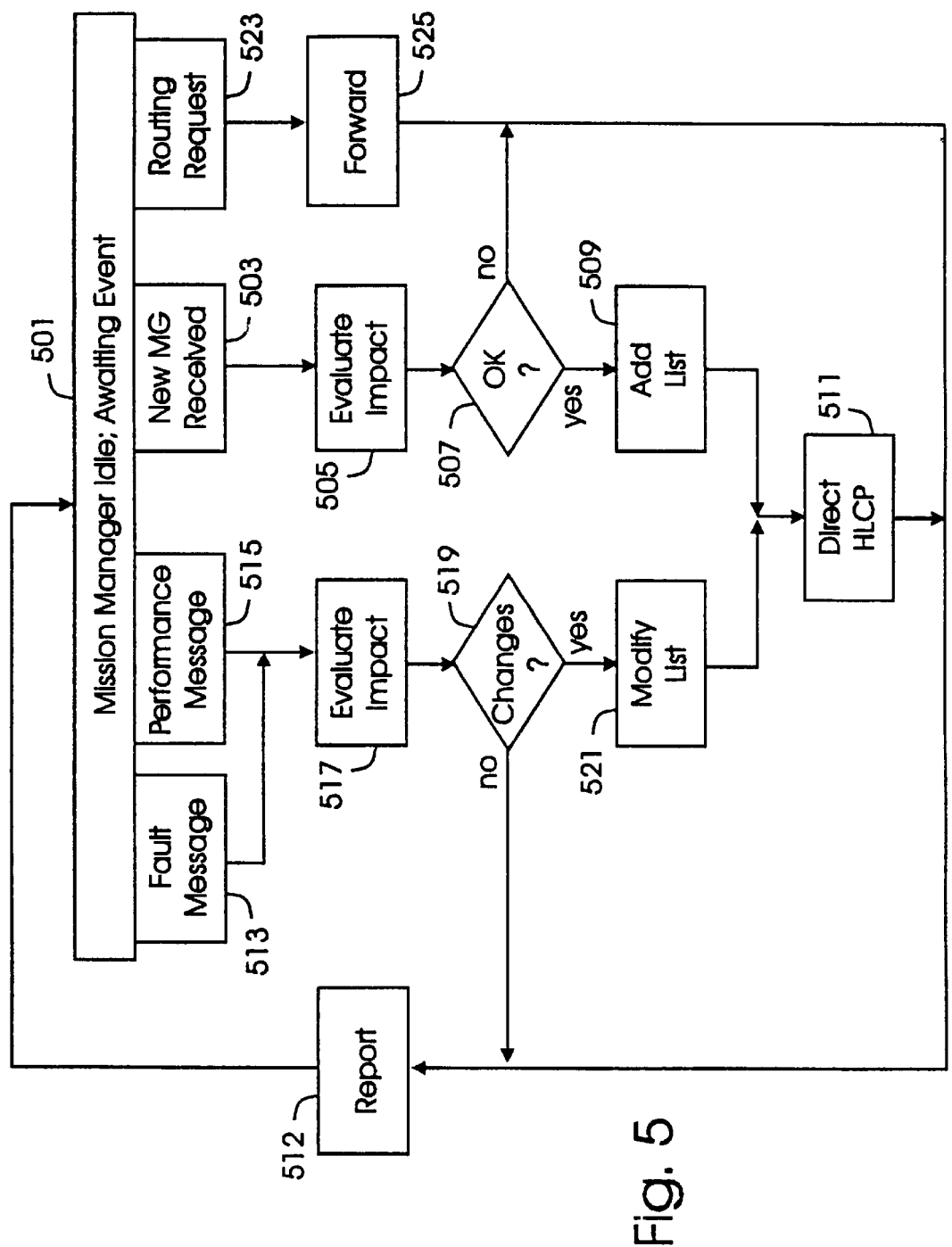
FIG. 5 is an exemplary flow diagram that illustrates much of the functionality of the mission manager found within the embodiment of the autonomous spacecraft of FIG. 4 in accordance with the present invention.

FIG. 5 is an exemplary flow diagram that illustrates much of the functionality of the mission manager found within the embodiment of the autonomous spacecraft of FIG. 4 in accordance with the present invention. At a block 501, the mission manager waits in an idle (low power) state for the occurrence of an event. If the event constitutes receipt of a new mission goal (MG), as indicated by a block 503, the mission manager exits the idle state to evaluate the mission goal at a block 505. As previously discussed, such evaluation takes into consideration other pending mission goals as well as the spacecraftís systems and resource status.

If the new mission goal can be performed, the mission manager branches from a decision block 507 to add the new mission goal to the list of pending mission goals at a block 509. Thereafter, at a block 511, the mission manager delivers the new mission goal to the HLC processor for queuing and later execution by the flight manager. After delivering the new mission goal, the mission manager may be configured to send a status report (an acknowledge in this case) to the source of the new mission goal at a block 512 before returning to the idle state at the block 501. If at the block 507 the mission manager determines that the new mission goal cannot be serviced, at a block 512 the mission manager sends a status report to the source and returns to the idle state at the block 501.

Fault or performance messages received from the fault analyst or the performance analyst also trigger events, as indicated by blocks 513 and 515, respectively. The mission manager responds by exiting the idle state and branching to a block 517 to evaluate the impact of the underlying fault or performance problem, and/or recovery or performance script. If changes need to be made to the current list of pending mission goals, as determined at a block 519, the mission manager modifies the list at a block 521. Thereafter, the mission manager informs the HLC processor of such changes at the block 511, reports to ground support at the block 512 and returns to the block 501 to reenter the idle state. The mission manager also services routing requests as indicated at a block 523. LLCs, HLCs, scripts, program modules, etc., are routed as indicated at the block 525, as discussed above with reference to FIG. 4, for example.

Figure 6:
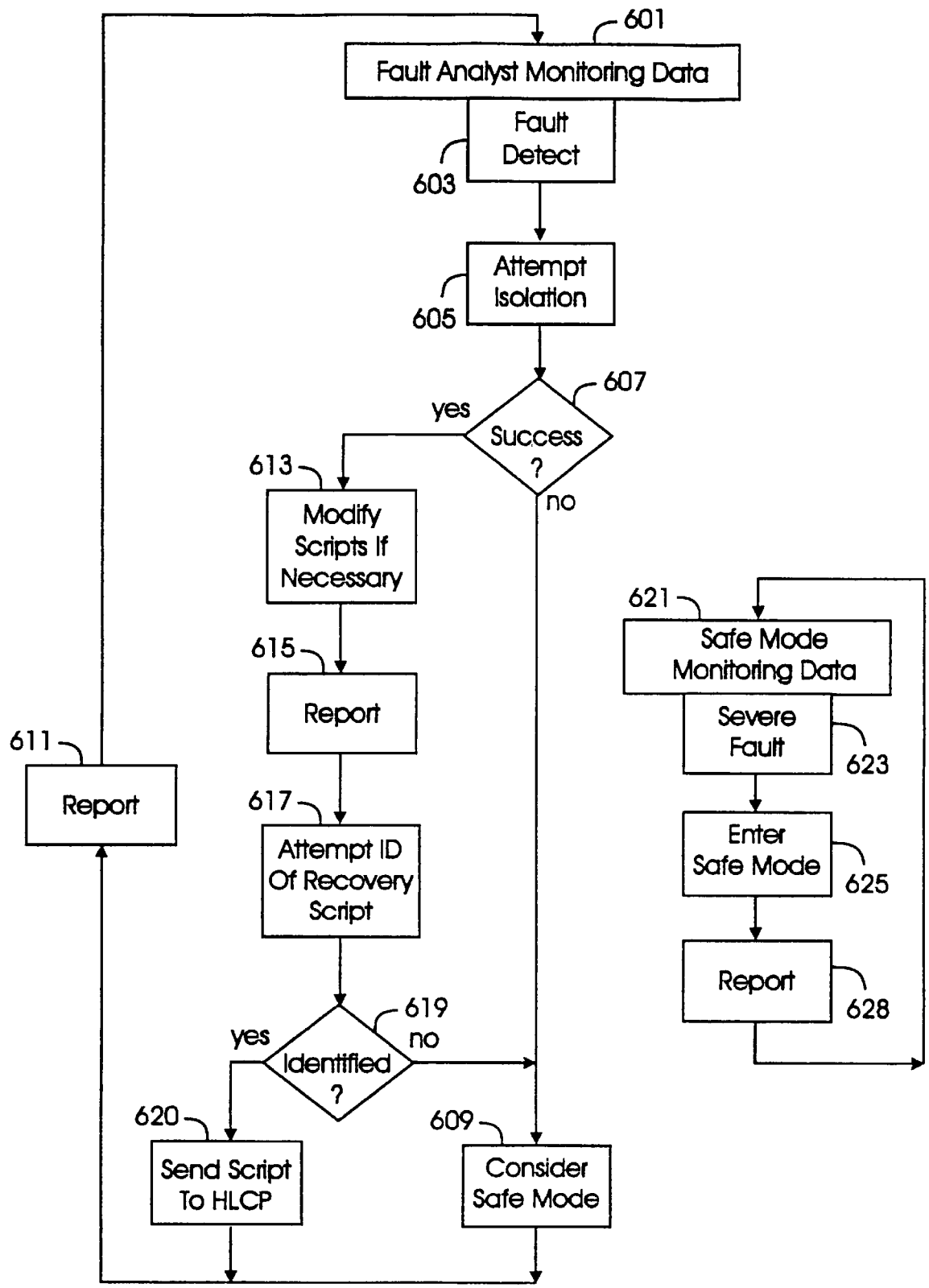
FIG. 6 is an exemplary flow diagram that illustrates much of the functionality of the fault analyst and safe mode operations found within the embodiment of the autonomous spacecraft of FIG. 4 in accordance with the present invention.

FIG. 6 is an exemplary flow diagram that illustrates much of the functionality of the fault analyst and safe mode operations found within the embodiment of the autonomous spacecraft of FIG. 4 in accordance with the present invention. At a block 601, the fault analyst selectively monitors sensor data, actuator commands, etc., to identify fault conditions. If a fault is detected, as indicated by the event block 603, the fault analyst attempts to isolate the fault at the block 605. If the fault could not be isolated, the fault analyst branches from a block 607 to a block 609 to consider placing the spacecraft in a safe mode or safe state, depending on the severity of the fault.

If the fault was successfully isolated, the fault analyst branches to a block 613, and modifies any script within the command script database as proves necessary to accommodate the fault. Such modification may also take the form of disabling certain scripts that cannot otherwise accommodate the fault. After reporting such modifications (if any) to ground support at a block 615, the fault analyst attempts to identify a fault recovery script at a block 617. If identified, the fault analyst branches from a block 619 to a block 620 where the identified script is delivered to the HLC processor (also identified as the ìHLCPî) then reports the fault at a block 611 before returning to the block 601. If no fault recovery script is identified at the block 619, the fault analyst considers placing the spacecraft in a safe mode then reports and returns to monitor data as indicated by the blocks 609, 611 and 601.

The HLC processor queues and executes recovery scripts received. If a recovery script proves unsuccessful, as identified for example by persistence of the fault condition at the block 603, the fault analyst reattempts fault isolation and recovery via the blocks 605 through 620, if alternate recovery scripts are available. Otherwise, the fault analyst branches through to the block 609 to consider placing the spacecraft in a safe mode. In this way, the fault analyst is able to try other recovery scripts if one or more recovery script candidates prove unsuccessful.

At any time during an attempt to recover, the safe mode module may take over. Specifically, at a block 621, the safe mode module monitors data to identify severe faults. If identified, as indicated at a block 623, the safe mode module places the spacecraft in a safe mode and reports such status to ground support at the blocks 625 and 628. The safe mode module operates rather rapidly in comparison to the fault analyst and, therefore, acts to encapsulate the spacecraft from the autonomous control system and to minimize damage caused by fault.

Figure 7:
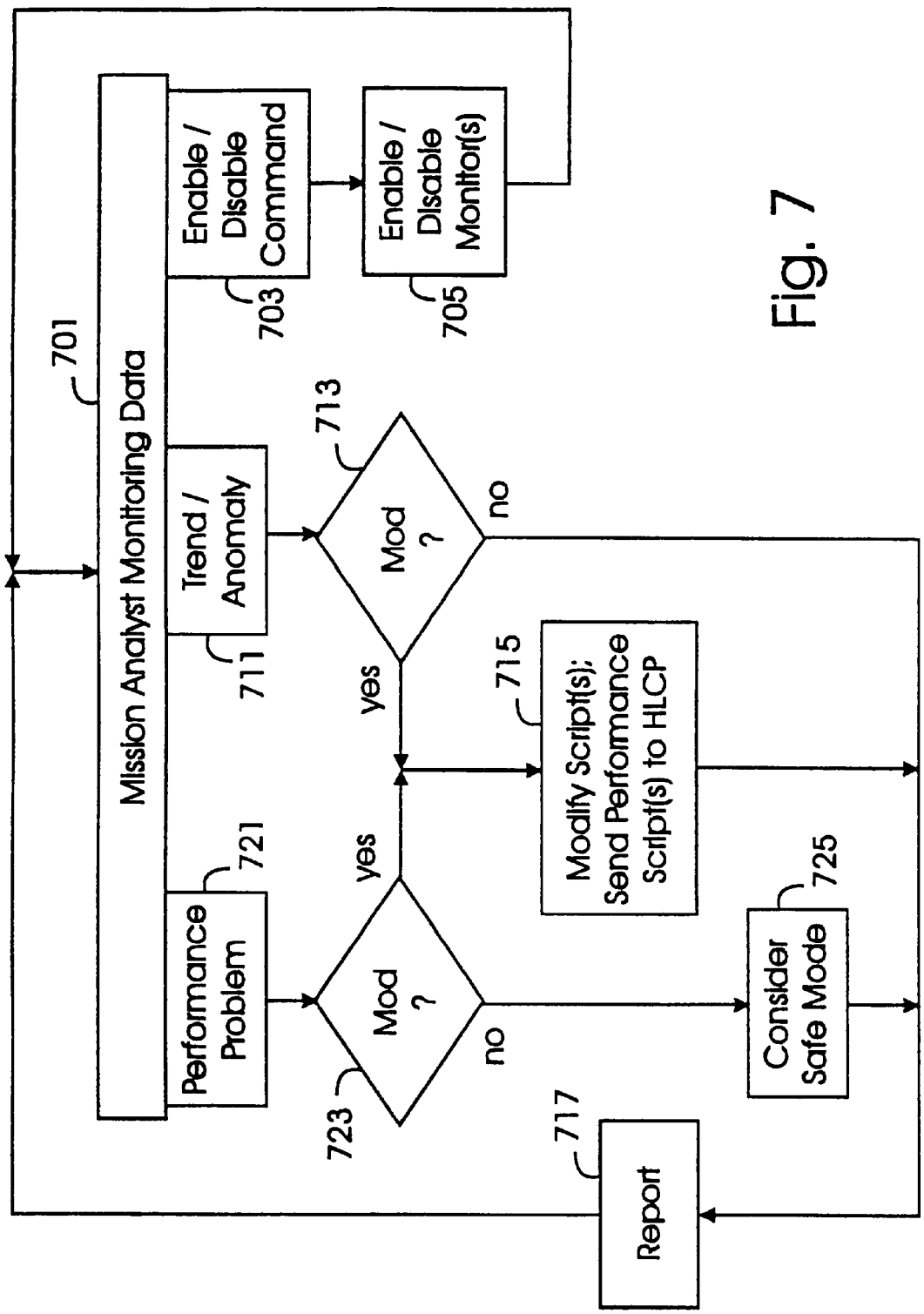
FIG. 7 is an exemplary flow diagram that illustrates much of the functionality of the mission analyst found within the embodiment of the autonomous spacecraft of FIG. 4 in accordance with the present invention.

FIG. 7 is an exemplary flow diagram that illustrates much of the functionality of the mission analyst found within the embodiment of the autonomous spacecraft of FIG. 4 in accordance with the present invention. At a block 701, the mission analyst utilizes a plurality of ìperformance monitorsî that monitor sensor readings, actuator commands and other spacecraft information to evaluate mission performance as directed by the HLC processor. For example, a different performance monitor (software module) might be enabled for a thruster-based control mode versus a wheel based control mode. In particular, at a block 703, if a command is received to enable or disable a performance monitor, the mission analyst branches to a block 705 to perform such command before returning to the block 701 to continue monitoring by all enabled performance monitors.

If an anomolous trend is detected in performance data being monitored as indicated by an event block 711, the mission analyst considers whether modifications to current scripts, goals or system operations should be made at a block 713. If so, such modifications are performed at the block 715 in the manner described above with reference to FIG. 4. Afterwards, the mission analyst reports the modifications to ground support and the mission analyst, and returns to the block 701 to continue enabled monitoring tasks. If the mission analyst identifies trends or anomalies rising to a problematic level, as indicated at a block 721, and cannot service the problem via the blocks 723 and 715, the mission analyst may resort to placing the spacecraft in a safe mode at a block 725 and await ground support direction.

In view of the above detailed description of the present invention and associated drawings, other modifications and variations will now become apparent to those skilled in the art. For example, although the functionality associated with autonomous control as described herein is illustrated in context of spacecraft embodiments, such functionality could also be placed within any remote non-spacecraft system which does not lend itself to non-autonomous approaches for fault management, e.g., aircraft, submarines or power plants. Also, the use of an HLC processor, although desirable in the embodiments illustrated, need not be included in the autonomous control system. Instead, one or more of the fault analyst, mission analyst and mission manager could directly generate and deliver LLCs to the flight manager. Likewise, the functionality of the HLC processor or any of the autonomous control system could be otherwise combined or distributed in many ways. It should be apparent that such and other modifications and variations may be effected in the embodiments described herein without departing from the spirit and scope of the present invention as set forth in the claims which follow.

We claim:

1. A spacecraft system having a ground-based system and a spacecraft, having an operational status, used to carry out a plurality of mission objectives, the spacecraft comprising:
   a plurality of actuators;
   a plurality of sensors that produce data indicative of the operational status of the spacecraft;
   a flight manager, coupled to the plurality of actuators and the plurality of sensors, that controls the plurality of actuators pursuant to any of a plurality of lower level commands;
   a transceiver capable of receiving both selected ones of the plurality of lower level commands from a ground-based system destined for the flight manager, and selected ones of a plurality of higher level commands that represent the plurality of mission objectives;
   an autonomous control system, communicatively coupled to the flight manager, that autonomously attempts to carry out the plurality of mission objectives through scheduling and occasionally rescheduling of the selected ones of the plurality of mission goals; and
   the autonomous control system generates, from the selected ones of the plurality of higher level commands, sequences of lower level commands that are delivered to the flight manager.

2. In the spacecraft system of claim 1, the autonomous control system comprising a fault detection and recovery module that analyzes the data produce by the plurality of sensors to detect and attempt recovery from fault conditions in the operational status of the spacecraft.

3. In the spacecraft system of claim 2, the autonomous control system further comprising a mission agent that responds to the fault detection and recovery module by attempting to reschedule the selected ones of the plurality of higher level commands to accommodate detected fault conditions.

4. In the spacecraft system of claim 1, the autonomous control system comprising a performance analyst that analyzes the data produce by the plurality of sensors to detect and attempt accommodation of unexpected performance in the operational status of the spacecraft.

5. In the spacecraft system of claim 4, the autonomous control system further comprising a mission agent that responds to the performance analyst by attempting to reschedule the selected ones of the plurality of higher level commands to accommodate the unexpected performance detected.

6. In the spacecraft system of claim 1, the autonomous control system comprising a command processor that performs the generation, from the selected ones of the plurality of higher level commands, the sequences of lower level commands that are delivered to the flight manager.

7. A spacecraft, having an operational status, used to carry out a plurality of mission objectives, the spacecraft comprising:

a plurality of sensors producing data indicative of the operational status of the spacecraft;

a plurality of actuators;

a controller, communicatively coupled to control the plurality of actuators, that operates pursuant to instructions received;

an analyzer communicatively coupled to the plurality of sensors to monitor and evaluate the data produced; and a mission manager, communicatively coupled to the analyzer, that schedules and occasionally reschedules instructions for the controller to autonomously carry out the plurality of mission objectives.

8. The spacecraft of claim 7 wherein the analyzer comprises a fault detection and recovery module that analyzes the data produce by the plurality of sensors to detect and attempt recovery from fault conditions in the operational status of the spacecraft.

9. The spacecraft of claim 8 wherein the mission manager responds to the fault detection and recovery module by attempting to reschedule the instructions for the controller to accommodate detected fault conditions.

10. The spacecraft of claim 7 wherein the analyzer comprises a performance analyst that analyzes the data produce by the plurality of sensors to detect and attempt accommodation of unexpected performance in the operational status of the spacecraft.

11. The spacecraft of claim 9 wherein the analyzer further comprises a performance analyst that analyzes the data produce by the plurality of sensors to detect and attempt accommodation of unexpected performance in the operational status of the spacecraft.

12. The spacecraft of claim 9 wherein sequences of the instructions are stored within the spacecraft in a hierarchical arrangement.

13. A spacecraft, having an operational status, used to carry out a plurality of mission objectives, the spacecraft comprising:

a plurality of actuators;

a plurality of sensors producing data indicative of the operational status of the spacecraft;

an analyzer communicatively coupled to the plurality of sensors to monitor and evaluate the data produced; and a mission manager, communicatively coupled to the analyzer, that schedules and occasionally reschedules higher level instructions to autonomously carry out the plurality of mission objectives;

a command processor, communicatively coupled to receive scheduled higher level instructions from the mission manager, that generates lower level instructions from the higher level instructions received; and a control module, communicatively coupled to control the plurality of actuators, that operates pursuant to lower level instructions received from the command processor.

14. The spacecraft of claim 13 wherein the analyzer comprises a fault detection and recovery module that analyzes the data produce by the plurality of sensors to detect and attempt autonomous recovery from fault conditions in the operational status of the spacecraft.

15. The spacecraft of claim 13 wherein the analyzer comprises a performance analyst that analyzes the data produce by the plurality of sensors to detect and attempt accommodation of unexpected performance in the operational status of the spacecraft.

16. The spacecraft of claim 13 wherein sequences of the higher level instructions are stored within the spacecraft in a hierarchical arrangement.

17. The spacecraft of claim 16 further comprising a library that contains sequences of the lower level instructions, and the command processor generates lower level instructions for each of the higher level instructions by referencing the library.

18. A spacecraft system having a spacecraft, with an operational status, capable of carrying out a plurality of mission objectives, the spacecraft system comprising:

a plurality of ground units each having a ground transceiver;

a plurality of actuators disposed on the spacecraft;

a plurality of sensors, disposed on the spacecraft, that produce data indicative of the operational status of the spacecraft;

a flight manager, disposed on the spacecraft, that controls the plurality of actuators pursuant to any of a plurality of lower level commands;

a spacecraft transceiver, disposed on the spacecraft, capable of receiving and routing ones of the plurality of lower level commands from at least one of the plurality of ground units to the flight manager;

an autonomous control system, disposed on the spacecraft and communicatively coupled to both the flight manager and the spacecraft transceiver, that autonomously carries out ones of the plurality of mission objectives through receipt, scheduling and occasionally rescheduling of mission objectives; and the autonomous control system translating the higher level commands into sequences of lower level commands for delivery to the flight manager.

19. The spacecraft system of claim 18 wherein at least one of the plurality of ground units comprises a ground support system.

20. The spacecraft system of claim 19 wherein at least one other of the plurality of ground units comprises a transmitter having a user interface to initiate delivery of one or more higher level commands to the autonomous control system via the spacecraft transceiver.

21. The spacecraft of claim 20 wherein the autonomous control system comprises a fault detection and recovery module that analyzes the data produce by the plurality of sensors to detect and attempt autonomous recovery from fault conditions in the operational status of the spacecraft.

22. The spacecraft of claim 21 wherein the autonomous control system further comprises a performance analyst that analyzes the data produce by the plurality of sensors to detect and attempt accommodation of unexpected performance in the operational status of the spacecraft.

\* \* \* \* \*